US012674332B2

(12) United States Patent
Marinelli et al.

(10) Patent No.: US 12,674,332 B2
(45) Date of Patent: Jul. 7, 2026

(54) TRAPDOOR-INSERT ASSEMBLY COMPRISING AN INSERT HOOKED TO THE TRAPDOOR

(71) Applicant: AKIFIX S.P.A., Bolzano (IT)

(72) Inventors: Andrea Marinelli, Bolzano (IT); Danilo Cascia, Maiolati Spontini (IT); Tommaso Raggetti, Ancona (IT)

( * ) Notice: Subject to any disclaimer, the term of this patent is extended or adjusted under 35 U.S.C. 154(b) by 205 days.

(21) Appl. No.: 18/359,646

(22) Filed: Jul. 26, 2023

(65) Prior Publication Data

US 2024/0044154 A1 Feb. 8, 2024

(30) Foreign Application Priority Data

Aug. 3, 2022 (IT) ........................ 102022000016497

(51) Int. Cl.
*E04F 19/08* (2006.01)

(52) U.S. Cl.
CPC ....... *E04F 19/083* (2013.01); *E05Y 2900/131* (2013.01)

(58) Field of Classification Search
CPC ........ E04F 19/083; E04F 19/08; E05C 17/20; E05C 17/047
See application file for complete search history.

(56) References Cited

U.S. PATENT DOCUMENTS 1,716,038 A * 6/1929 Ferris ...................... E04B 9/003 16/268
3,125,970 A * 3/1964 Schneider .............. A47B 57/56 108/109
4,139,249 A * 2/1979 Hillman .............. E05B 65/0014 292/87
5,445,451 A * 8/1995 Harmony ............... A47B 88/57 312/333
5,645,304 A * 7/1997 Richardson ......... E05B 65/0014 292/19
8,888,146 B2 * 11/2014 Taylor ..................... E05C 17/54 292/DIG. 46
10,837,202 B2 * 11/2020 Andersen ............ E05B 65/0014
2005/0091930 A1 * 5/2005 Langenhorst ......... E04F 19/083 49/394
2025/0163753 A1 * 5/2025 Marinelli .............. E06B 3/9641

FOREIGN PATENT DOCUMENTS

DE 203 11 070 * 12/2003
EP 1516979 A1 3/2005

* cited by examiner

*Primary Examiner* — Gregory J Strimbu
(74) *Attorney, Agent, or Firm* — Egbert, McDaniel & Swartz, PLLC

(57) ABSTRACT

A trapdoor-insert assembly having a trapdoor with a fixed frame, a movable frame disposed in the fixed frame and a panel mounted on the movable frame. At least one of the frames including at least one section having a longitudinal seat defined by a bottom wall and by two sidewalls. The two sidewalls include two projecting wings in opposite parallel positions that extend for the entire length of the section. The assembly also includes an insert, which is connected to the section and has an operating portion and a coupling body with two retaining teeth that extend along opposite directions and are engaged under the two projecting wings.

6 Claims, 10 Drawing Sheets

TRAPDOOR-INSERT ASSEMBLY COMPRISING AN INSERT HOOKED TO THE TRAPDOOR

CROSS-REFERENCE TO RELATED APPLICATIONS

Not applicable.

FIELD OF THE INVENTION

The present patent application for industrial invention relates to a trapdoor-insert assembly comprising an insert that is fastened to the trapdoor.

BACKGROUND OF THE INVENTION

As it is well known, a trapdoor is installed at openings in walls in such a way as to provide access to a compartment behind the wall, thus allowing for the inspection of electrical, plumbing or similar systems installed in the compartment.

A conventional trapdoor comprises:

- a fixed frame suitable for being fixed to a wall at a wall opening,
- a movable frame disposed in the fixed frame, and
- a panel mounted on said movable frame; and
- connection means arranged at one rear side of the trapdoor and connecting the movable frame to the fixed frame so that the movable frame can be moved from an opening position to a closing position.

Each frame consists of four sections arranged at right angle and connected by means of corner pieces comprising two 90° wings, each one being connected to two adjacent sections.

The connection of a wing of the corner piece to the respective section can be made by means of threaded fastening means (screws or bolts), by means of welding or, in the case where at least one section has a C-section defining a longitudinal seat that is open at the ends, by inserting the wing of the corner piece into the end of the longitudinal seat.

Trapdoors are also provided with elements or inserts connected to the sections of the frames such as:

- supports for elastic locking means of click clack type; or
- eyelets on which a string is tied to stop the opening travel of the movable frame relative to the fixed frame.

Said secondary elements can be connected to the sections by means of threaded connection means (screws and bolts) or by means of welding. Both connection methods, however, are rather inconvenient since the threaded connection is a complicated and time-consuming operation and also involves drilling the elements, affecting both the elements and the sections and severely impairing the aesthetics of the trapdoor, whereas the connection by means of welding involves making an irreversible junction that, once the element is welded, prevents the element from being replaced or removed in case one wants to change the structural setting of the trapdoor.

In cases where one of the two frames comprises at least one C-shaped section, another solution can be used to connect the secondary element to the section of the frame. Such a solution provided for equipping the secondary element with a slider that corresponds to the longitudinal seat of the section so that it can be inserted into the longitudinal seat, passing through the ends of the longitudinal seat, before the trapdoor is assembled. It is obvious, however, that this solution cannot be used in the case where the trapdoor is already assembled because the access to the ends of the longitudinal seat would be obstructed by the wings of the corner pieces.

EP1516979A1 describes an access door suitable for being installed in a wall. The access door comprises a fixed outer frame comprising sections and corner pieces, a movable inner frame comprising sections and corner pieces, and a panel supported by the movable inner frame.

BRIEF SUMMARY OF THE INVENTION

It is precisely from the careful observation of the problems faced by trapdoors of the prior art that the present invention was devised, the purpose of which is to provide a new solution that allows an insert to be connected to a section with a C-shaped section of the fixed or movable frame of the trapdoor in a simple and fast manner even when the trapdoor is already assembled.

More specifically, it is the purpose of the present invention to devise a trapdoor-insert assembly in which the insert can be easily and quickly attached to a section of the fixed or movable frame of the trapdoor even when the trapdoor is already assembled, avoiding the use of welding and/or threaded connection means.

A further purpose of the present invention is to devise a trapdoor-insert assembly that is inexpensive, simple and quick to make.

BRIEF DESCRIPTION OF THE SEVERAL VIEWS OF THE DRAWINGS

For the sake of explanatory clarity, the description of the trapdoor-insert assembly according to the invention continues with reference to the attached drawings, which have only illustrative and non-limiting value, wherein.

DETAILED DESCRIPTION OF THE INVENTION

With reference to the attached figures, a trapdoor-insert assembly is described according to the invention.

Referring to FIGS. 1, 2, 3, and 4, the trapdoor-insert assembly comprises a trapdoor (100) comprising:

- a front side (LA) and a back side (LP);
- a fixed frame (1) suitable for being fixed to a wall in a wall opening;
- a movable frame (2) disposed in the fixed frame (1);
- a panel (E) mounted on said movable frame (2), and;
- connection means (C) arranged at the back side (LP) of the trapdoor (100) and connecting the movable frame (2) to the fixed frame (1) so that the movable frame (2) can be moved between an opening position and a closing position.

The fixed frame (1) and the movable frame (2) each comprise four sections (3*a*, 3*b*) and four corner pieces (5*a*, 5*b*).

Each corner piece (5*a*, 5*b*) connects two adjacent sections (3*a*, 3*b*) in perpendicular position.

Figure 5:
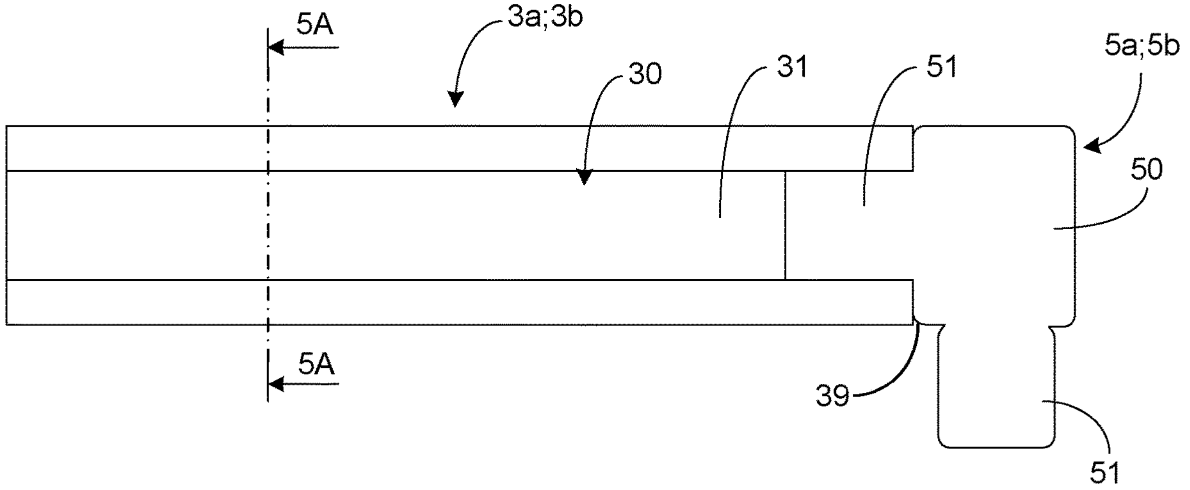
FIG. 5 is a diagrammatic top view which illustrates the way in which a corner piece of the frame is coupled to a section of the frame.
Figure 5A:
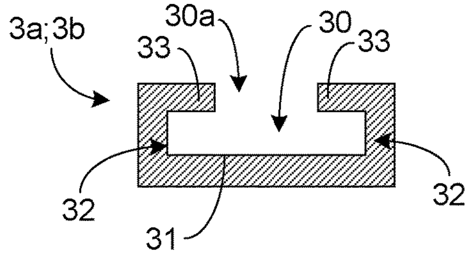
FIG. 5A is a cross section of a section of the frame sectioned according to the VI-VI plane in FIG. 5.

Referring to FIGS. 5 and 5A, each section (3*a*, 3*b*) has a C-shaped cross-section and comprises a longitudinal seat (30) that is defined by a bottom wall (31) and two sidewalls (32). The sidewalls (32) comprise two projecting wings (33) in opposite parallel position that extend along the entire length of the section and define a narrowed inlet (30*a*) giving access to the longitudinal seat (30).

Preferably each section (3*a*, 3*b*) has ends cut at 90°. Each corner piece (5*a*, 5*b*) comprises a central portion (50) suitable for abutting said ends (39) of two adjacent sections (3*a*, 3*b*) and two side inserts (51) that protrude from the central portion (50) so as to fit from the ends (39) of the sections (3*a*, 3*b*) inside the longitudinal seat (30) to mate with the sections (3*a*, 3*b*).

Figure 1:
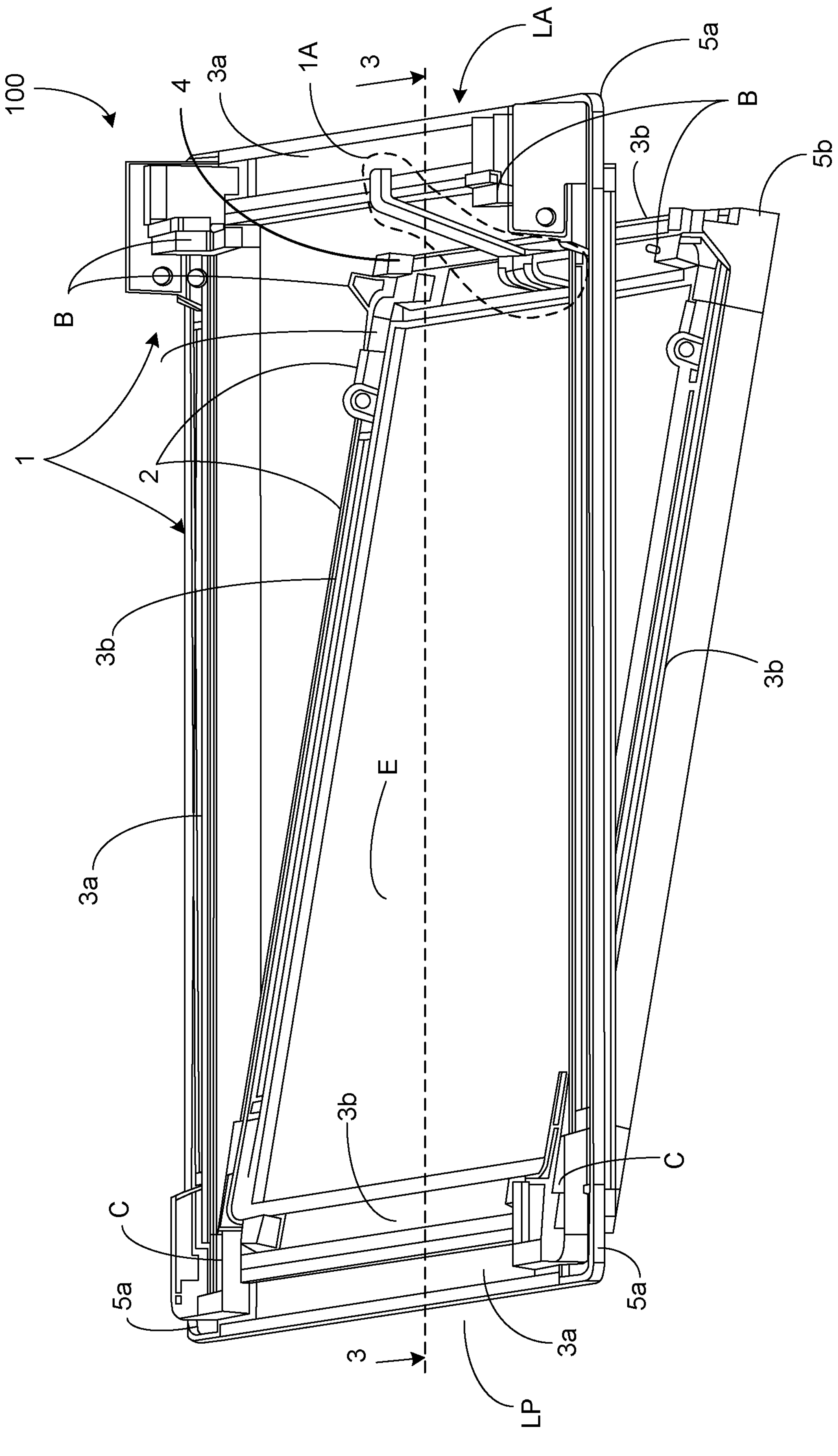
FIG. 1 is an axonometric view of a trapdoor-insert assembly according to the invention, with the trapdoor in opening position.
Figure 1A:
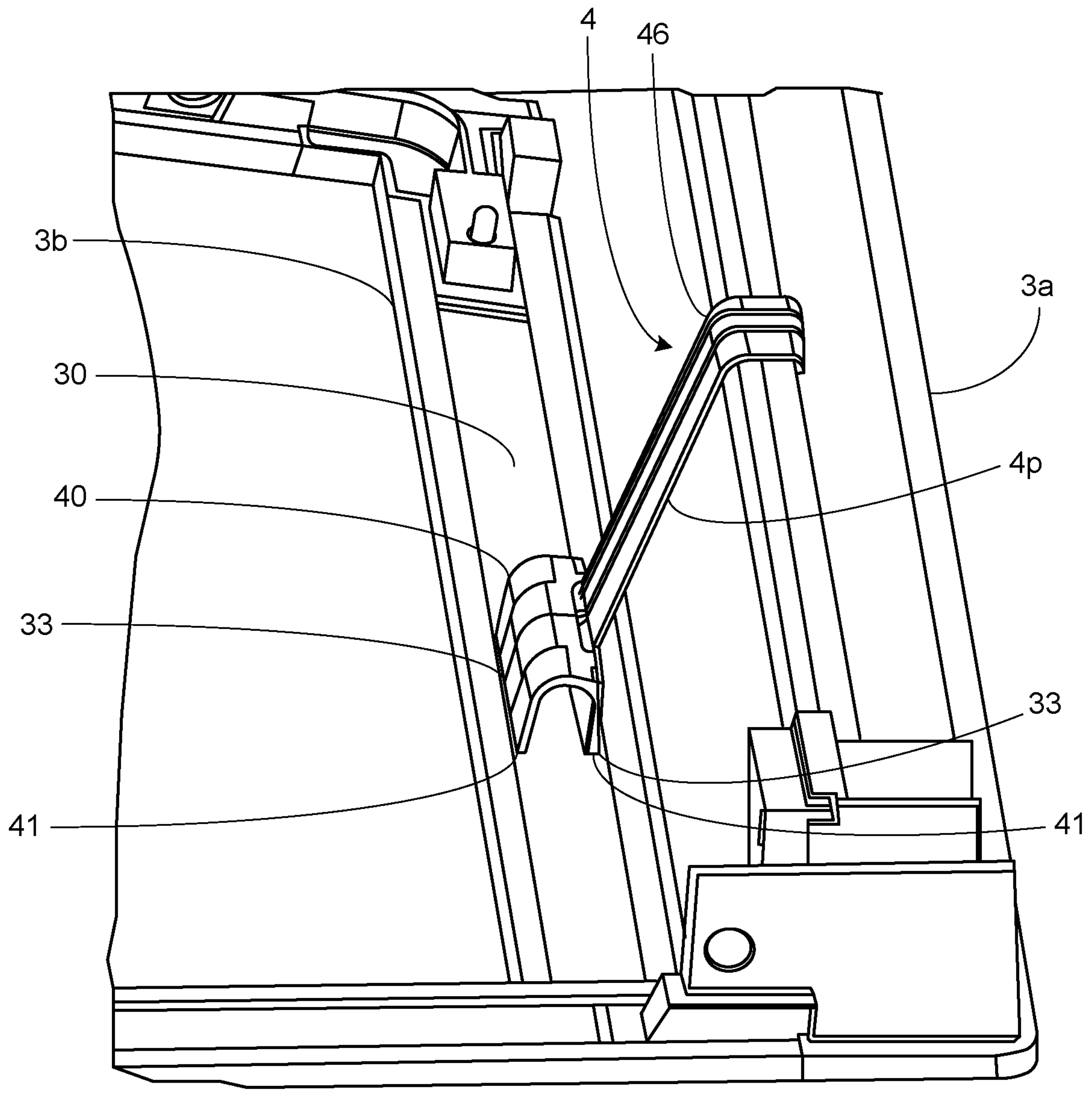
FIG. 1A is an enlargement of a detail of FIG. 1 enclosed in the closed line indicated by O1.
Figure 1B:
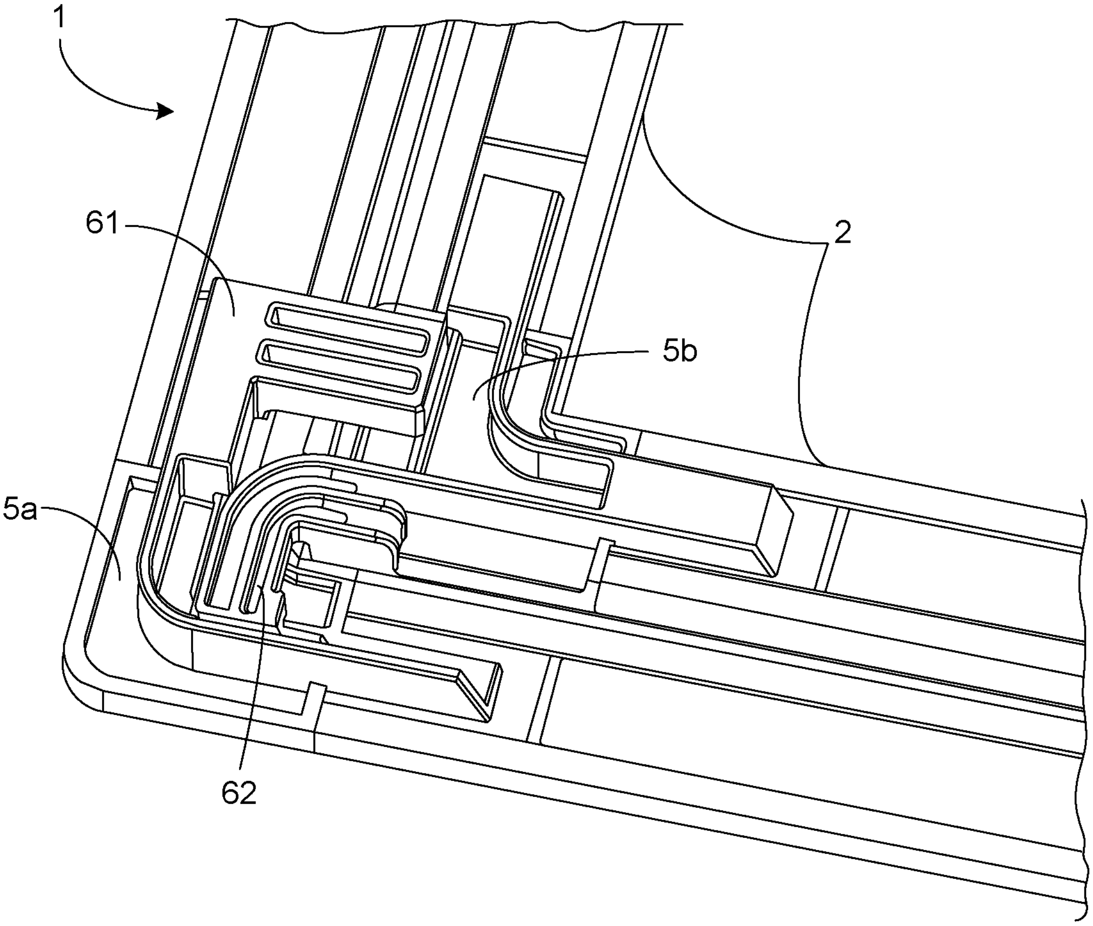
FIG. 1B is an axonometric view of a part of the trapdoor illustrating in particular the connection means between the movable frame and the fixed frame.

With particular reference to FIG. 1B, the connection means (C) comprise suspension fittings (61, 62) arranged between the movable frame (2) and the fixed frame (1) in corner areas adjacent to each other and arranged at the back side (LP) of the trapdoor (100). The suspension fittings (61, 62) are conformed in such a way to tilt the movable frame (2) relative to the fixed frame (1) without uncoupling the movable frame (2) from the fixed frame (1).

The suspension fittings (61, 62) specifically comprise:

- a first piece (61) having a first section connected to the fixed frame (1) and a second section overlying the movable frame (2) and against which the same movable frame (2) interferes;
- a second piece (62) having a first section connected to the movable frame (2) and a second section overlying the fixed frame (1) and against which the same fixed frame (1) interferes.

The first section of the first piece (61) is attached to the corner piece (5*a*) of the fixed frame (1), and the second section of the first piece (61) interferes with the corner piece (5*b*) of the movable frame (2).

The first section of the second piece (62) is attached to the corner piece (5*b*) of the movable frame (2), and the second section of the second piece (62) interferes with the corner piece (5*a*) of the fixed frame (1).

Figure 2:
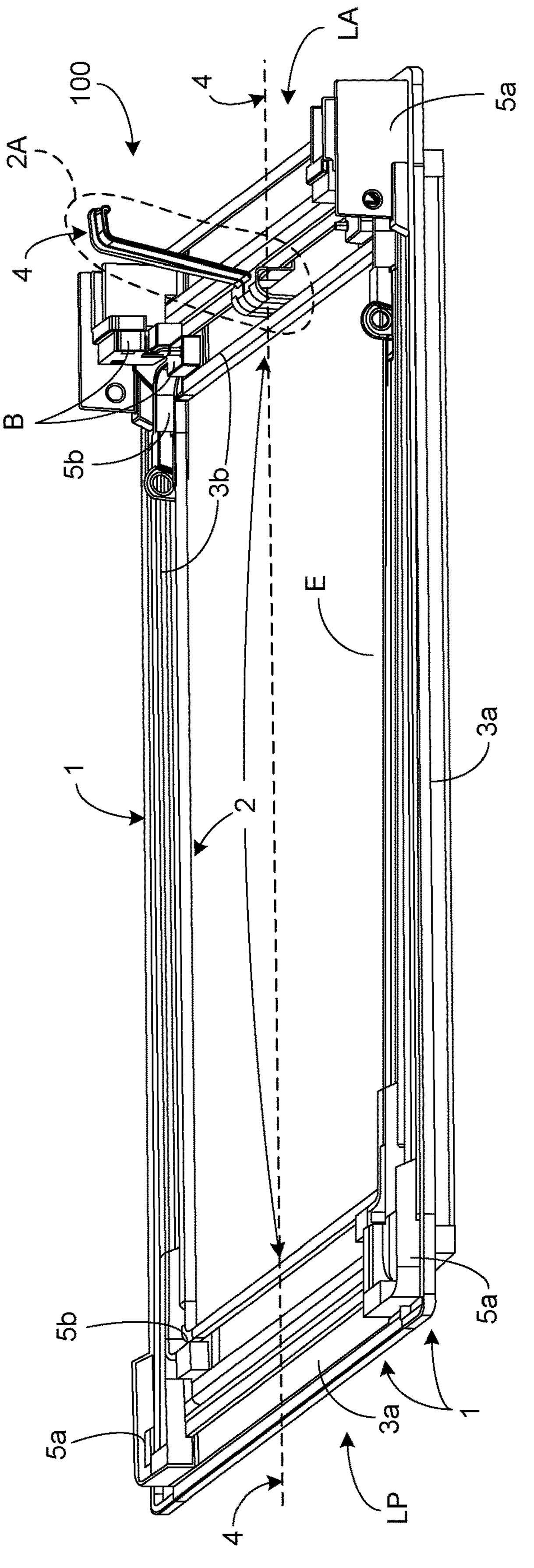
FIG. 2 is an axonometric view of a trapdoor-insert assembly according to the invention, with the trapdoor is closing position.
Figure 2A:
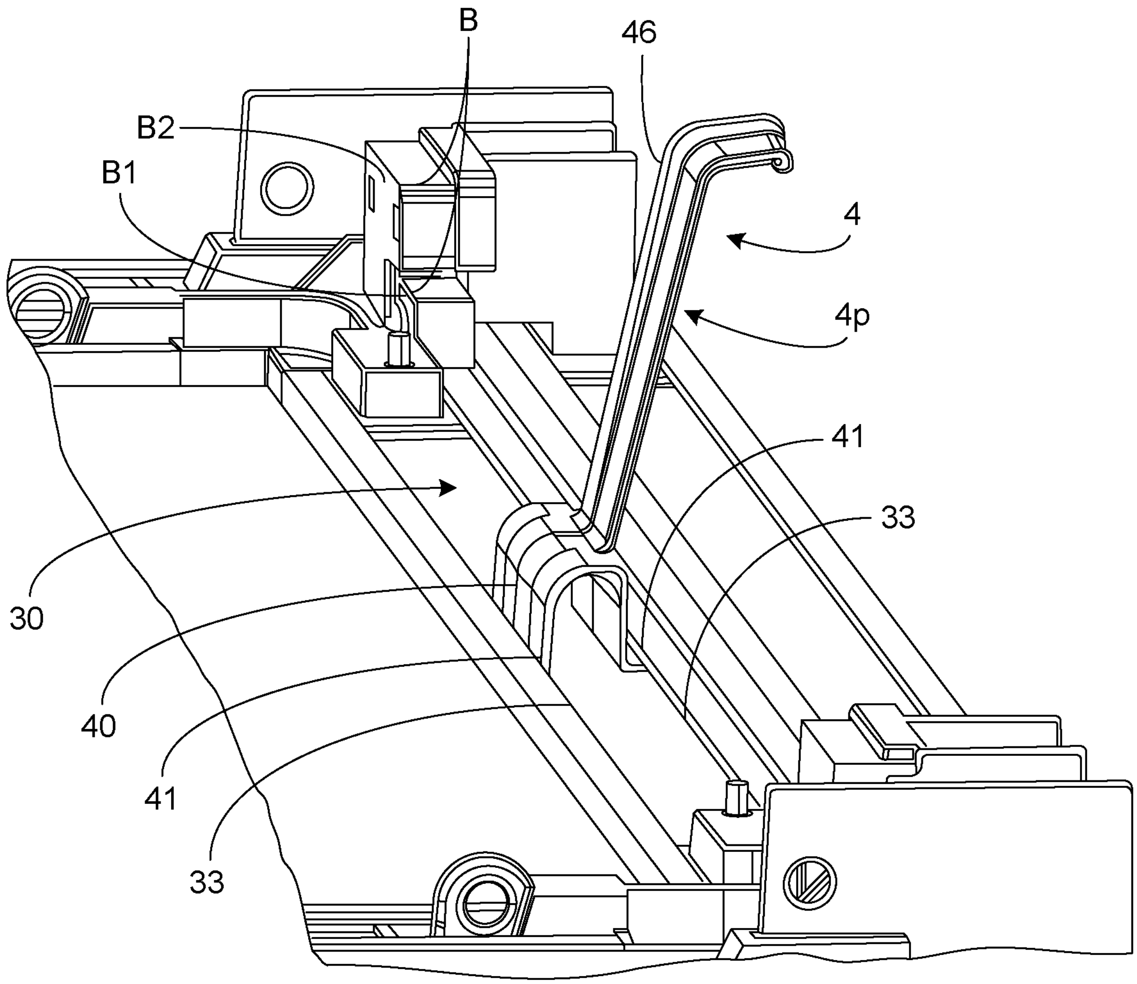
FIG. 2A is an enlargement of a detail of FIG. 2 enclosed in the closed line indicated by O2.
Figure 3:
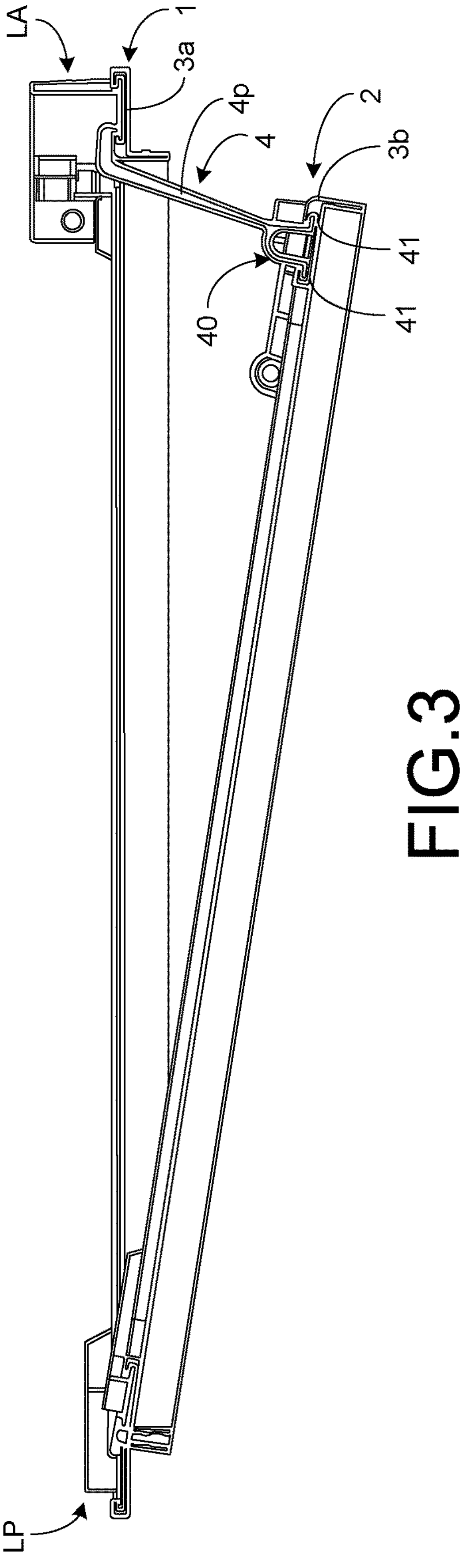
FIG. 3 is a side section view of the assembly shown in FIG. 1, sectioned according to the I-I plane shown in FIG. 1.
Figure 4:
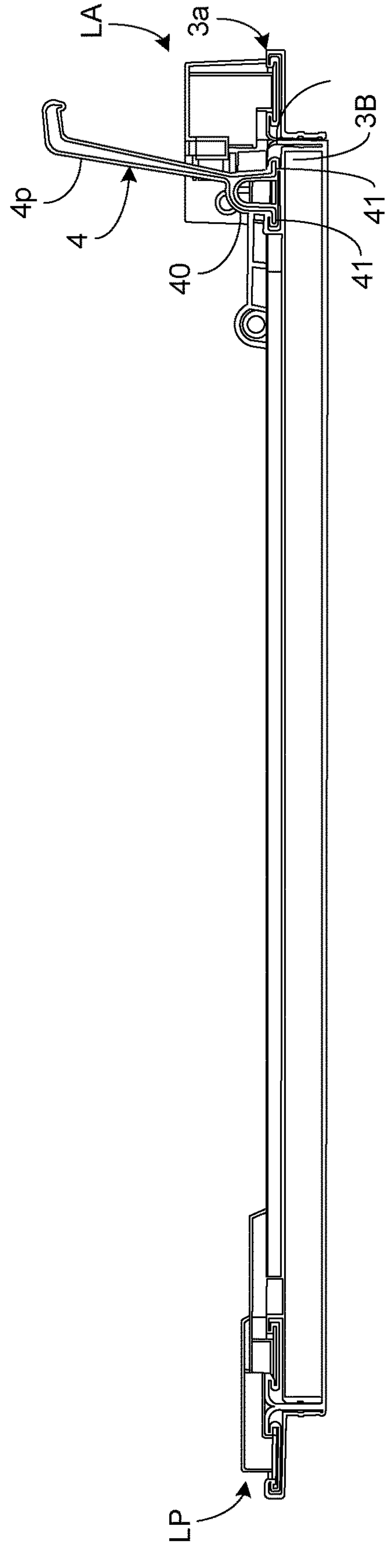
FIG. 4 is a side section view of the group shown in FIG. 2, sectioned according to the II-II plane shown in FIG. 2.

With reference to FIGS. 1, 2, and 2A the corner areas of the front side (LA) of the trapdoor (100) can be provided with locking means (B) conformed in such a way as to lock the movable frame (2) relative to the fixed frame (1) in the closing position.

Said locking means (B) comprise a hook (B1) provided on the movable frame (2) that interacts with a corresponding elastic fastening device (B2) of click clack type provided on the fixed frame (1). The fastening device (B2) is conformed in such a way to retain the hook (B1) while still allowing the hook (B1) itself to be released and thus the movable frame (2) to be opened when a user pulls on the movable frame (2) with a force that overcomes the resistance of elastic means of the fastening device (B2). Said locking means (B) are known to a technician of the field and therefore will not be described in detail in the present invention.

Referring to FIGS. 1A, 2A, 6, 7 and 8, the trapdoor-insert assembly (100) according to the invention also comprises an insert (4) which is connected to the section (3).

The insert (4) comprises an operating portion (4*p*) and a coupling body (40) comprising two retaining teeth (41) that extend along parallel and opposite directions to each other and are engaged below the two projecting wings (33), respectively. Otherwise said, each retaining tooth (41) is interposed between a projecting wing (33) and the bottom wall (31) of the section (3).

The coupling body (40) is suitably shaped to allow the retaining teeth (41) to move closer together until they reach an arrangement in which the volume in width of the two retaining teeth (41) is less than the width of the narrowed inlet (30*a*) so that said retaining teeth (41) can first cross the narrowed inlet (30*a*) along a direction that is orthogonal or incident to the bottom wall (31) and then, once they have crossed the narrowed inlet (30*a*), they can move away from each other in order to be engaged below the projecting wings (33).

In the preferred embodiment said coupling body (40) is of elastic type and is conformed in such a way as to allow a user to bring the two retaining teeth (41) closer together by overcoming the elastic resistance offered by the elastic coupling body (40) and then, after crossing the narrowed inlet (30*a*), release the coupling body (40) so that the retaining teeth (41) move away and elastically engaged in place below the projecting wings (33).

The coupling body (40) comprises two opposing, elastically flexible legs (42*b*), each one ending with said retaining teeth (41). Each retaining tooth (41) forms a dihedral angle (γ) comprised between 80° and 100° with an end section of the corresponding leg (42*b*).

More precisely, the coupling body (40) comprises an elastic clip comprising an omega-shaped plate (42) with a central axis (Y) and comprising said two legs (42*b*) terminating with said retaining teeth (41) and a top portion (42*a*) connecting the two legs (42*b*).

In an alternative embodiment of the invention, shown in FIGS. 11 and 11A, instead of comprising said omega-shaped plate (42), the coupling body (40) may comprise two rigid legs (47) movably connected to each other, which terminate with said retaining teeth (41) and between which an elastic means (M) (such as a spring) is provided to constantly exert a repulsive action such that the two legs (47) are maintained in their maximum diverged position. The two legs (47) are connected to each other by means of a pin (P). The spring (M) is loaded by bringing the two legs (47) closer together (see FIG. 11A) in such a way that, as soon as the legs (47) are released, the spring (M) exerts a repulsive action such to restore the position of the legs (47) shown in FIG. 11.

Optionally, in order to prevent the coupling body (40) from sliding along the longitudinal seat (30) of the section (3), the projecting wings (33) can be deformed to define a protrusion that protrudes inside the longitudinal seat (30) and is coupled by interference with the retaining tooth (41) of the coupling body (40) arranged below the projecting wing (33).

With reference to FIGS. 1A, 2A, 6, 7, and 8, said insert (4) consists of an end-strop element conformed in such a way as to stop the opening travel of the movable frame (2) in order to prevent an injury in the event of accidental disengagement of the movable frame (2) from the fixed frame (1).

In such a case, the coupling body (40) of the insert (4) is attached to a section (3*b*) of the movable frame (2) arranged at the front side (LA) of the trapdoor (100), and the operating portion (4*p*) of the insert (4) comprises an arm (45) which protrudes from the coupling body (40) and is shaped to intercept the fixed frame (1) when the movable frame (2) moves from the closing position to the opening position so as to stop the opening travel of the movable frame (2).

Figure 6:
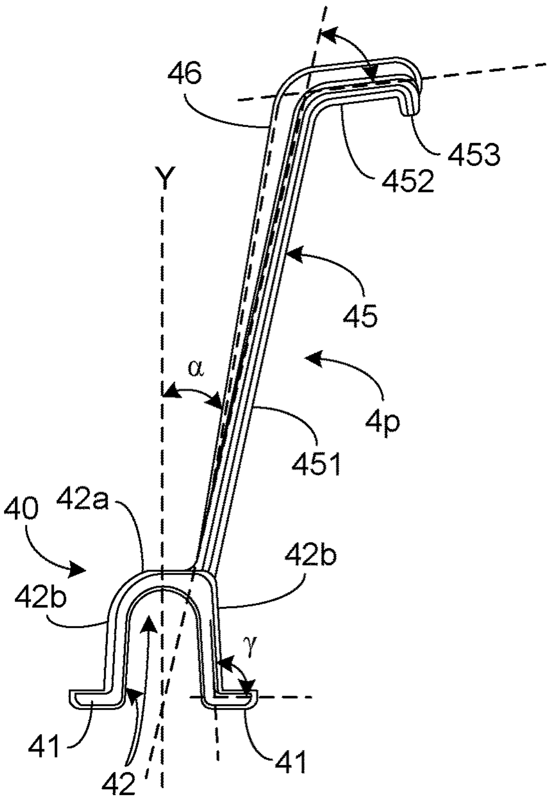
FIG. 6 is a side view of an insert acting as an end-stop means.
Figure 7:
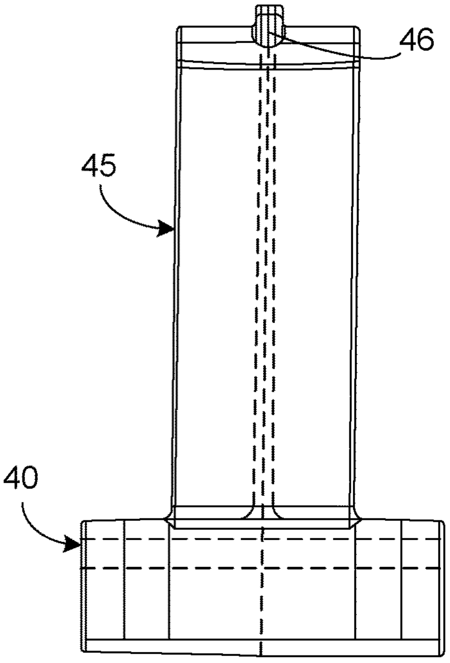
FIG. 7 is a rear view of the insert in FIG. 6.
Figure 8:
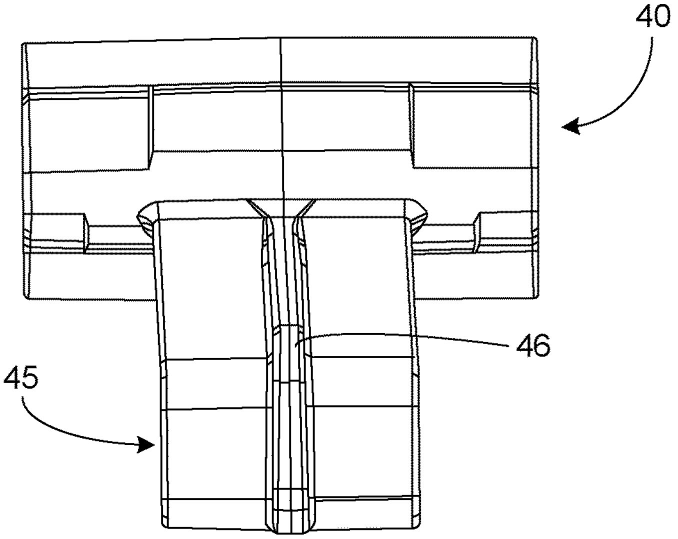
FIG. 8 is a top view of the insert in FIG. 6.

With particular reference to FIGS. 6, 7 and 8 the arm (45) comprises:

- a first section (451) projecting from the top portion (42*a*) of the coupling body (40) and defining a dihedral angle ($\alpha$) comprised between 25° and 65° with the central axis (Y) of the omega-shaped plate (42); and
- a second section (452) that defines a dihedral angle ($\beta$) comprised between 60° and 90° with the first section (451); said second section (452) comprises a folded end tooth (453) suitable for intercepting and engaging with said fixed frame (1).

In order to increase the rigidity of the arm (45), said arm (45) is provided with a central median partition 46) with gradually increasing height going from the first section (451) to the second section (452) of the arm (45).

Figure 9:
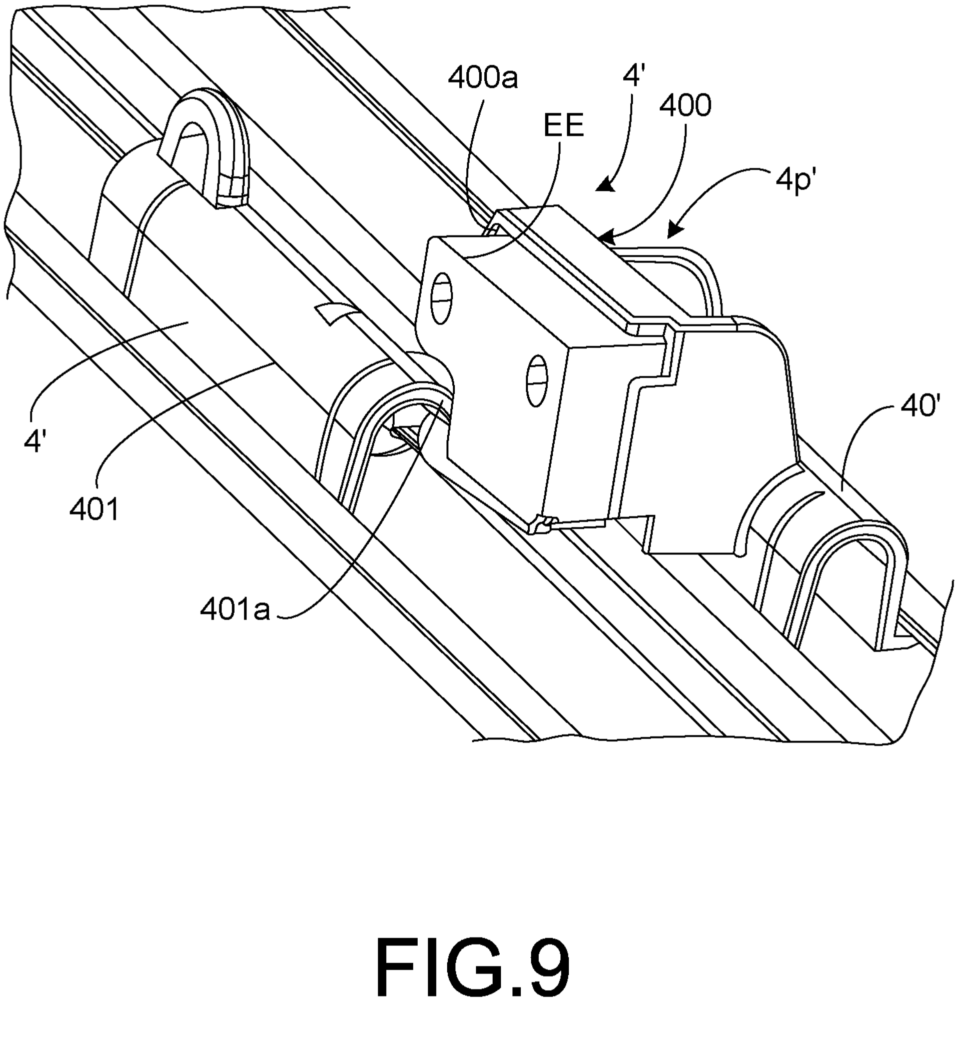
FIG. 9 is an axonometric view of two inserts suitable for acting as locking means of the trapdoor.

With reference to FIG. 9, other examples of inserts (4') are shown, which differ from the insert (4) shown in FIGS. 1A, 2A, 6, 7, and 8 in that the operating portion (4*p*) is connected to the coupling body (40'). In such a case, the two inserts (4') act as auxiliary locking means that can be used as an alternative to the locking means (B) or even together with the locking means (B) to ensure a more stable and effective locking of the movable frame (2) in the closing position.

In such a case the two inserts (4') comprise:

- a first insert (400) suitable for being connected to the section (3*a*) of the fixed frame (1) and comprising a support (400*a*) as operating portion (4*p'*), which is suitable for holding and supporting an elastic coupling device (EE) of click clack type, and
- a second insert (401) suitable for being connected to the section (3*b*) of the movable frame (2) and comprising a retaining lug or hook (401*a*) connected to the coupling body as operating portion (4*p*), which is suitable for coupling with the elastic coupling device (EE) of click clack type supported by said support (400*a*) of the first insert (400).

Figure 9A:
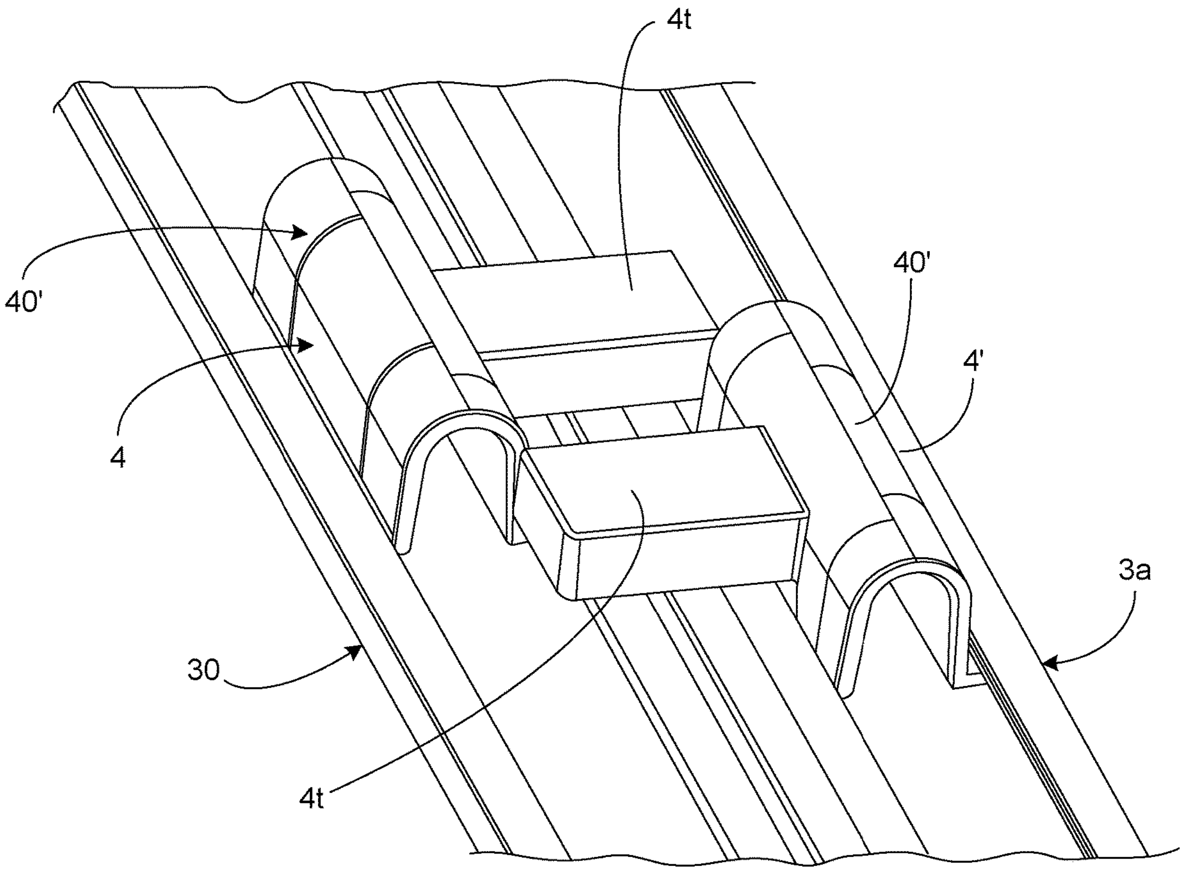
FIG. 9A is an axonometric view of two inserts suitable for acting as anti-warping means of the trapdoor.

It should be noted that although inserts acting as end-stop means or locking means have been shown as inserts (4) in this patent application, the inserts may also consist of inserts with different functions, changing the configuration of said operating portion. By way of example, as shown in FIG. 9A, the operating portion may consist of parallelepiped blocks (4*t*) projecting from the coupling body (40') and overhanging the adjacent section in order to act as anti-warping means of the trapdoor (100).

To assemble the trapdoor-insert assembly according to the invention, firstly the trapdoor (100) is assembled and then, once the trapdoor (100) is assembled, the insert (4) is provided.

Finally, it should be noted that, although the appended figures show that the coupling body (40) is of elastic type, in an alternative version of the invention said coupling body (40) may comprise adjusting and locking means that allow the retaining teeth (41) to be moved apart from each other and closer together. It is meant that, by way of example, said retaining teeth (41) may be mounted on two legs that are hinged to each other and can be lockable in more or less divergent position by means of special locking means arranged between the two branches.

As a result of the above description, it becomes evident how the present invention succeeds in achieving its intended purposes.

In particular, thanks to the fact that the coupling body (40) allows the retaining teeth (41) to be brought closer and farther apart, it is possible to hook any insert (4) provided with said coupling body (40) to a section in a very quick and easy way, even when the trapdoor (100) is already assembled.

Numerous variations and changes may be made to the present embodiment of the invention, within the reach of an expert of the field, while still falling within the scope of the invention.

We claim:

1. A trapdoor-insert assembly comprising:

a trapdoor having a front side and a back side, said trapdoor having a fixed frame adapted to being fixed to an opening in a wall, said trapdoor having a movable frame disposed in the fixed frame, said trapdoor having a panel mounted on the movable frame, wherein a connector is affixed to the back side of said trapdoor so as to connect the movable frame to the fixed frame such that the movable frame is movable between an opening position and a closing position;

a longitudinal seat formed on or affixed to at least one section of the movable frame adjacent the front side, said longitudinal seat defined by a bottom wall and a pair of side walls, wherein the pair of side walls comprises a pair of projecting wings in opposing parallel positions and extending for an entire length of the longitudinal seat so as to define a narrowed inlet that provides an access to said longitudinal seat; and an insert having an operation portion and a coupling body, the coupling body having a pair of retaining teeth that extend in opposite directions and are engaged respectively under the pair of projecting wings, wherein the pair of retaining teeth are movable toward each other until the pair of retaining teeth reach a position such that the pair of retaining teeth are able to pass through the narrowed inlet along a direction that is generally orthogonal to the bottom wall, wherein the pair of retaining teeth are movable away from each other so as to be respectively engaged under the pair of projecting wings, wherein the operation portion comprises an arm which protrudes from the coupling body and is configured to intercept the fixed frame when the movable frame is moved from the closing position to the opening position so as to stop a travel of the movable frame.

2. The trapdoor-insert assembly of claim 1, wherein the coupling body is elastic and configured such that the pair of retaining teeth are movable toward each other by overcoming an elastic resistance of the coupling body, wherein the pair of retaining teeth are elastically inserted under the pair of projecting wings when the coupling body is compressed and then released.

3. The trapdoor-insert assembly of claim 1, wherein the coupling body has a pair of opposite elastically flexible legs, the pair of opposite elastically flexible legs terminating at the pair of retaining teeth.

4. The trapdoor-insert assembly of claim 3, wherein each retaining tooth of the pair of retaining teeth forms a dihedral angle of between 80° and 100° with respect to an end portion of a respective one of the flexible legs of the pair of flexible legs.

5. The trapdoor-insert assembly of claim 1, wherein the coupling body has an omega-shaped elastically flexible clip with a central axis and a pair of legs terminating respectively at the pair of retaining teeth, the coupling body having a top portion connecting the pair of legs.

6. The trapdoor-insert assembly of claim 5, wherein the arm comprises:

a first section projecting from the top portion of the coupling body so as to define a dihedral angle of between 25° and 65° with respect to the central axis; and a second section defining another dihedral angle of between 60° and 90° with respect to said first section, said second section having a folded end tooth that is engageable with the fixed frame.

* * * * *